(12) United States Patent
Diez Marin et al.

(10) Patent No.: US 8,696,027 B2
(45) Date of Patent: Apr. 15, 2014

(54) POSITIONER OF SAFETY BELT FOR VEHICLES

(75) Inventors: Monica Diez Marin, Valladolid (ES); Julio Abajo Alonso, Valladolid (ES); Roberto Martín Macías, Valladolild (ES)

(73) Assignee: Fundacion Cidaut, Valladolid (ES)

( * ) Notice: Subject to any disclaimer, the term of this patent is extended or adjusted under 35 U.S.C. 154(b) by 0 days.

(21) Appl. No.: 13/142,978

(22) PCT Filed: Nov. 22, 2010

(86) PCT No.: PCT/ES2010/070754
§ 371 (c)(1), (2), (4) Date: Jun. 30, 2011

(87) PCT Pub. No.: WO2011/157863
PCT Pub. Date: Dec. 22, 2011

(65) Prior Publication Data
US 2013/0221649 A1    Aug. 29, 2013

(51) Int. Cl.
*B60R 22/14*  (2006.01)
*B60R 22/30*  (2006.01)

(52) U.S. Cl.
USPC ........ 280/808; 280/801.1; 297/465; 297/467; 297/483

(58) Field of Classification Search
USPC ............... 280/801.1, 808; 297/464, 465, 467, 297/468, 483, 486, 466, 485
See application file for complete search history.

(56) References Cited

U.S. PATENT DOCUMENTS

| | | | | |
|---|---|---|---|---|
| 4,610,463 A | * | 9/1986 | Efrom | 280/751 |
| 5,005,865 A | | 4/1991 | Kruse | |
| 5,156,436 A | * | 10/1992 | Grene | 297/466 |
| 5,257,854 A | * | 11/1993 | Korneliussen | 297/468 |
| 5,352,024 A | * | 10/1994 | Grene | 297/485 |
| 5,624,136 A | * | 4/1997 | McGlothlin et al. | 280/801.1 |
| 5,795,030 A | * | 8/1998 | Becker | 297/488 |
| 6,273,467 B1 | * | 8/2001 | Berke et al. | 280/751 |
| 6,517,163 B2 | * | 2/2003 | Herrmann | 297/467 |
| 6,902,193 B2 | * | 6/2005 | Kim et al. | 280/801.1 |
| 6,935,700 B1 | | 8/2005 | Nerette | |
| 7,270,347 B1 | | 9/2007 | Zlojutro | |
| 8,182,043 B2 | * | 5/2012 | Baladi | 297/467 |
| 2002/0140279 A1 | * | 10/2002 | Arditi et al. | 297/485 |
| 2011/0001311 A1 | * | 1/2011 | Hofferberth | 280/805 |
| 2012/0025589 A1 | * | 2/2012 | Calderon, Jr. | 297/485 |

FOREIGN PATENT DOCUMENTS

| | | | | |
|---|---|---|---|---|
| DE | 3122743 | | 12/1982 | |
| DE | 3301385 | | 7/1984 | |
| DE | 4236055 A1 | * | 4/1994 | ............. B60R 22/14 |

(Continued)

OTHER PUBLICATIONS

International Search Report Issued for PCT/ES2010/070754 mailed Apr. 24, 2011.

*Primary Examiner* — Faye M Fleming
*Assistant Examiner* — Laura Freedman
(74) *Attorney, Agent, or Firm* — Banner & Witcoff, Ltd.

(57) ABSTRACT

Vehicle seatbelt positioner for pregnant women and persons with abdominal problems that acts on the shoulder strap and the lap belt, coupled to the user, easy to install and remove, which prevents an incorrect positioning of the seatbelt that could harm the user in case of accident.

19 Claims, 3 Drawing Sheets

(56) References Cited

FOREIGN PATENT DOCUMENTS

| EP | 1193143 | 4/2002 |
|----|---------|--------|
| GB | 2383979 | 7/2003 |
| GB | 2402653 | 12/2004 |
| GB | 2423057 | 8/2006 |
| WO | 9008676 | 2/1990 |

* cited by examiner

POSITIONER OF SAFETY BELT FOR VEHICLES

The present application claims priority to PCT/ES2010/070754 filed Nov. 22, 2010, 2011, the contents therein is incorporated by reference.

TECHNICAL FIELD OF THE INVENTION

The present invention lies in the field of seatbelts for vehicles, and more specifically that of positioners for these seatbelts meant for pregnant women and people with abdominal problems.

The said invention is a vehicle seatbelt positioner that acts on the shoulder strap and the lap belt, coupled to the user, easy to install and remove, which prevents an incorrect positioning of the seatbelt that could harm the user in case of accident.

BACKGROUND OF THE INVENTION

It has been observed that the main cause of unborn baby fatalities in traffic accidents is death of the mother. While pregnant, most women either drive cars or are passengers in them. Thus, protecting mothers and reducing their risk of death in an accident indirectly implies protecting the unborn baby.

It is known that seatbelts are the most effective passive safety devices. Several studies have shown satisfactory results when using a three-point seatbelt, which once buckled is divided into two segments or belts: a shoulder strap that retains the upper body, and a lap belt that retains the hips.

These studies show that the lap belt must be as low as possible and close to the hips, never on the stomach or abdomen, while the shoulder belt must lie between the breasts, on the middle part of the sternum and on the centre of the collarbone, avoiding its position over a single breast, and pass around the abdomen and not above it. The height of the shoulder strap must be adjusted to keep it away from the neck but in contact with the shoulder, as well as close to the body, not loose.

However, the anatomical shape of pregnant women, particularly during late pregnancy, makes it difficult to position the seatbelt properly, implying a reduced efficacy of this device and a higher risk to the unborn baby.

Specifically, an incorrect position of the shoulder strap can cause lacerations to the neck. In addition, the lower part of the shoulder strap can slide above the midsection, potentially causing detachment of the placenta or crushing the unborn baby due to the mother's inertia during the impact.

In addition, the lap belt, even if it is initially positioned correctly under the abdomen, can easily move upward in case of strong braking or if the pregnant women moves, which can place the woman and unborn baby in a dangerous situation. In case of accident, if this belt is incorrectly positioned or is not buckled, it can move upwards during the impact, resulting in a strong impact on the abdomen, as in addition to the stopping force of the pregnant woman, the upward speed of the lap belt applies additional pressure on it. This pressure can result in a ruptured uterus or damage the formation of vital organs of the unborn baby. It has even been shown that some children have suffered irreparable damage due to the injuries caused by seatbelts while in their mother's womb.

Positioners are known that keep seatbelts in the correct position, but they only act on the lap belt, making it pass under the abdomen. This is the case of the positioners described in U.S. Pat. No. 6,935,700, U.S. Pat. No. 5,005,865, WO9008676 and EP1193143.

These positioners consist in a cushion placed on the seat of the vehicle in which the pregnant women is sitting that has an attachment element that passes between the thighs (in the case of U.S. Pat. No. 6,935,700, U.S. Pat. No. 5,005,865 and WO9008676) or two attachment elements on either side of the thighs (as described in patent EP1193143) that hold the lap belt, moving it towards the lower part of the abdomen.

Other positioners, such as that described in U.S. Pat. No. 7,270,347, simply comprise a strap joined to the seat at the headrest that runs down the back of the seat, passing over the seat base towards the front part of the seat, so that when the pregnant woman is sitting on it it passes between her thighs and holds down the lap belt.

A drawback of all the aforementioned devices is that they are joined to the vehicle seat, embracing the seat back or the headrest, so that they cannot be used correctly in all seats of the vehicle, such as in the rear seats. In addition, these devices only act on the lap belt and not on the shoulder strap, so that they do not prevent their incorrect positioning.

In addition, there are other positioners, such as that described in patent GB2423057, that act only on the shoulder strap and not on the lap belt. This devices consists in a harness that holds the pregnant woman by the torso, which is fastened to the shoulder strap at the rear, in the back, by a hook. With this system, the lap belt behaves exactly as if the device were not present, so that it does not keep it from riding over the pregnant woman's abdomen and in case of accident can potentially injure the unborn baby.

To solve the drawbacks of the state of the art, the present invention is proposed for a vehicle seatbelt positioner that acts on the shoulder strap and the lap belt, coupled to the user, easy to install and remove, which prevents an incorrect positioning of the seatbelt that could harm the user in case of accident.

DESCRIPTION OF THE INVENTION

The present invention is established and characterised in the independent claims, while the dependent claims describe additional characteristics thereof.

Seatbelt positioner for pregnant women and people with abdominal problems, wherein the seatbelt comprises a shoulder strap corresponding to the diagonal segment that passes over the user's torso, and a lap belt corresponding to the horizontal segment that passes over the user's lap, which comprises; an upper part on which runs the shoulder strap, with the form of a vest, the anterior lower part of which being above the upper edge of the user's abdomen; a lower part that is placed such that the user sits on it, which in turn comprises means for guiding the lap belt; and a middle part that connects the upper and lower parts.

An advantage of this invention is that it does not interfere with the correct functioning of the seatbelt in case of accident, instead preventing incorrect positions of the seatbelt when the seatbelt begins actuating.

A further advantage is that it is easy to install and remove, considering the limitations of its potential users for both installation and in emergency situations when it may be necessary to exit the vehicle quickly.

Another advantage is that it is coupled to the user, not to the vehicle, so that it is independent of which vehicle seat the user sits in. In addition, it is equally valid for any orientation of the seatbelt and driving position, both left and right. Moreover, it is independent of the vehicle and can be used in any vehicle: cars, buses, trains, trucks, etc.

Yet another advantage resulting from the above is that it does not interfere with other users of the vehicle. This is, as it is not left in the vehicle, if a different driver uses it she or he will not be inconvenienced by the positioner, as it is not left in the vehicle.

Another advantage of the invention is that it can be used and is compatible with all pregnancy stages.

BRIEF DESCRIPTION OF THE DRAWINGS

This specification is supplemented with a set of drawings illustrating the preferred embodiment, which are never intended to limit the invention.

DETAILED DESCRIPTION OF THE PREFERRED EMBODIMENT OF THE INVENTION

Figure 1:
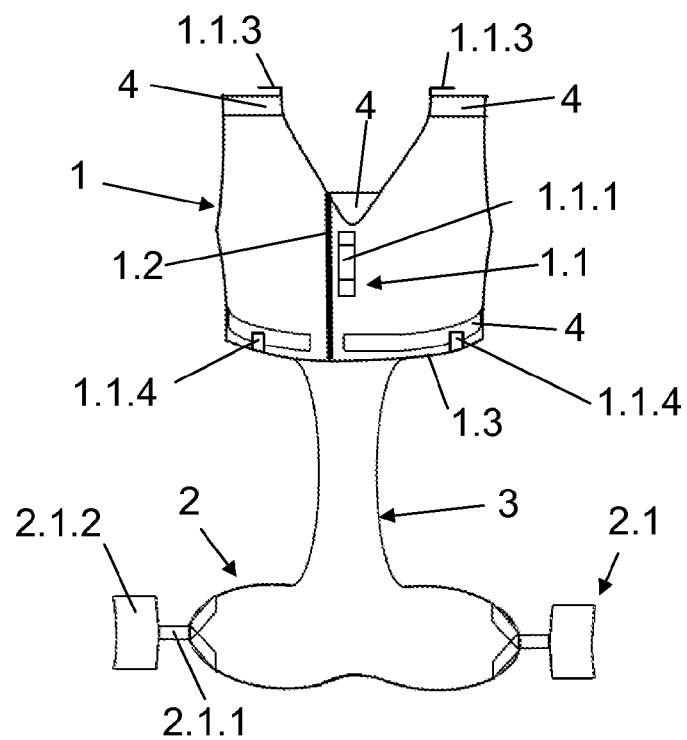
FIG. 1 shows a front view of an embodiment of the invention, in which the guiding means for the shoulder strap are a guide disposed vertically, the lap-belt guiding means are placed on either side of the user's thighs and the middle part is over the lower back.
Figure 2:
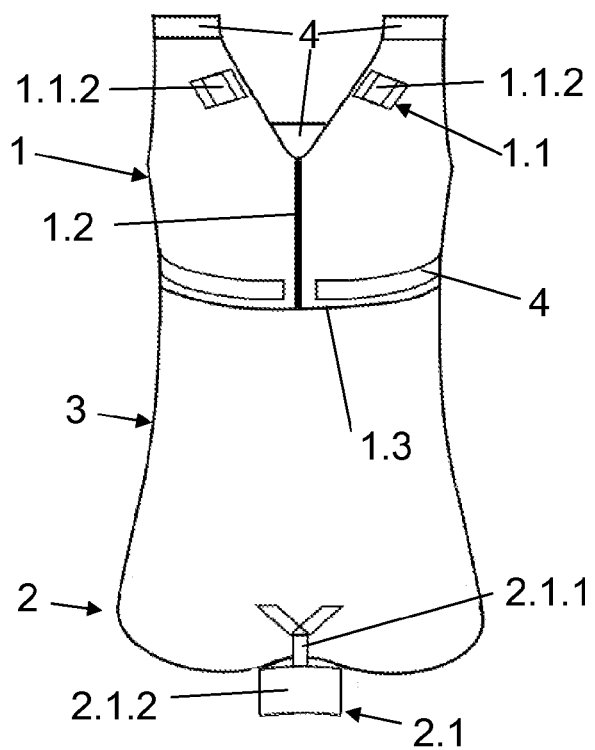
FIG. 2 shows a front view of another embodiment of the invention, in which the guiding means for the shoulder strap are two guides disposed inclined on both sides of the neckline, the lap-belt guiding means are placed between the user's thighs and the middle part covers the entire back.
Figure 3:
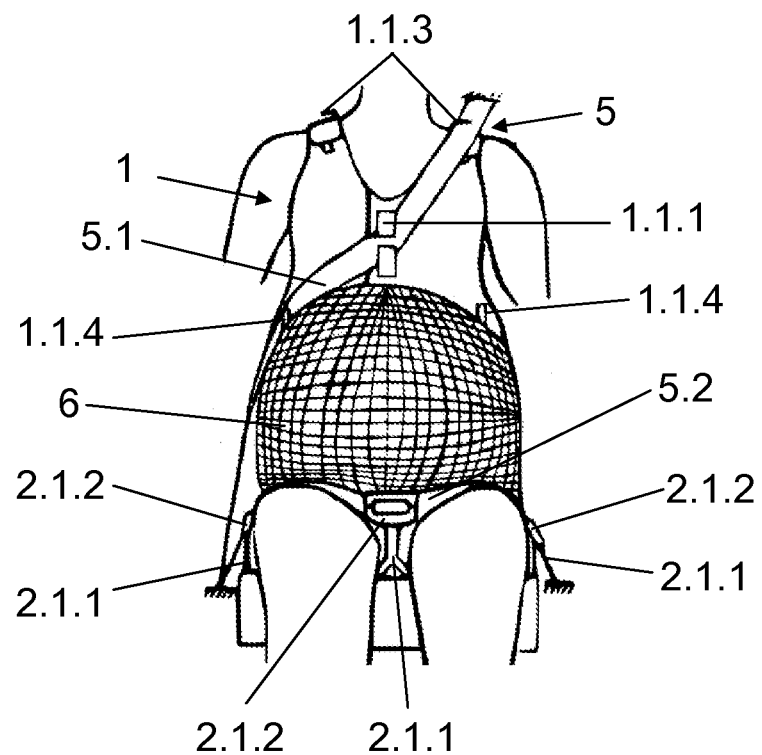
FIG. 3 shows a front view in the usage position of the embodiment of FIG. 1, with a mesh added.
Figure 4:
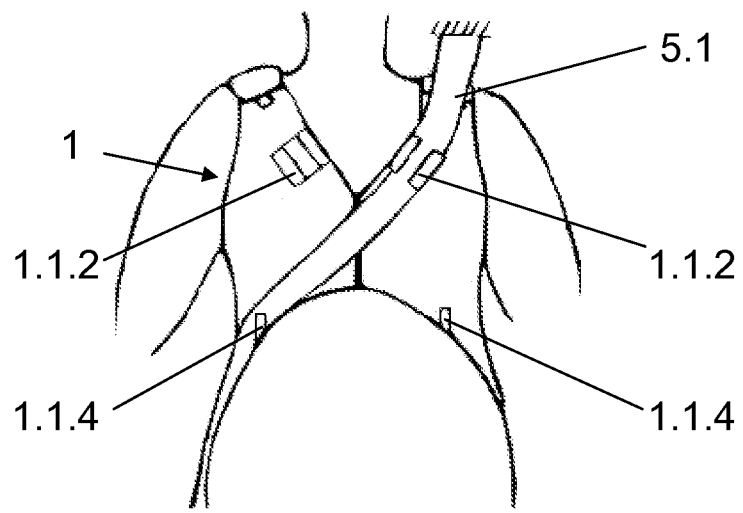
FIG. 4 shows a front enlarged view in the usage position of the embodiment of FIG. 2.
Figure 5:
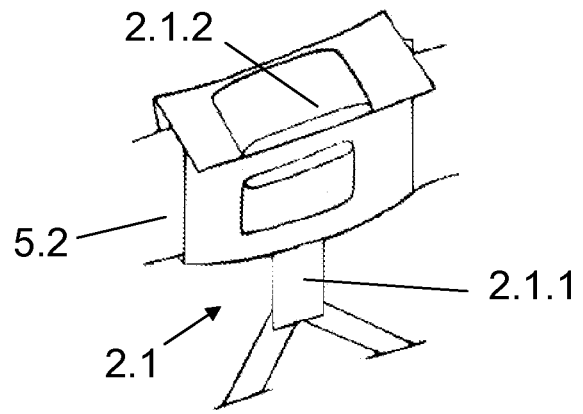
FIG. 5 shows an enlarged perspective view of the envelope-type lap-belt guiding means.
Figure 6:
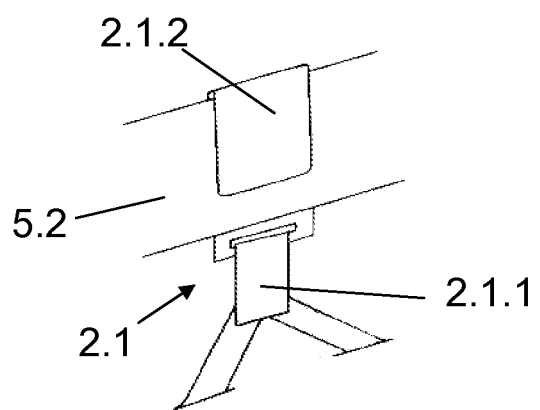
FIG. 6 shows an enlarged perspective view of the hook-type lap-belt guiding means.
Figure 7:
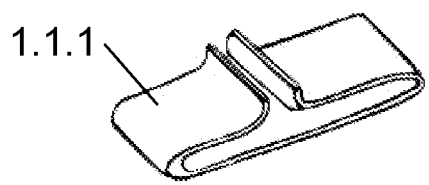
FIG. 7 shows a perspective view of a guide for the shoulder strap of the type disposed vertically for the mid-zone of the user's sternum.
Figure 8:
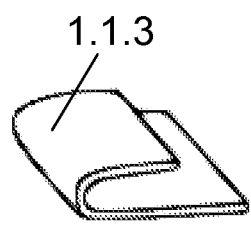
FIG. 8 shows a perspective view of a shoulder or lap guide for the shoulder strap.

The present invention relates to a vehicle seatbelt positioner (5) for pregnant women and people with abdominal problems. The seatbelt is a standard three-point seatbelt, so that it comprises two segments or straps: a shoulder strap (5.1) corresponding to the diagonal segment that crosses the user's chest, and a lap belt (5.2) corresponding to the horizontal segment that runs over the user's lap.

The disclosed embodiment of the invention comprises an upper part (1) above which runs the shoulder strap (5.1), in the form of a vest, a lower part (2) that in turn comprises lap-belt guiding means (2.1) and a middle part (3) that connects the upper part (1) to the lower part (2).

In this way, the upper part (1) in the form of a vest is an item without sleeves, and in its minimal expression can consist of joined straps or, more commonly, as a clothing vest. As a particular feature of this vest, the anterior lower edge (1.3) is located above the upper edge of the user's abdomen, thereby leaving it free and exempt of loads in case of collision. It can have closing means (1.2) on its anterior part.

The middle part (3) of the positioner runs along the user's back. It can have different configurations: A strap that runs on the backbone, two straps that run on either side of the backbone, covering the entire back in the corresponding area, etc.

The lower part (2) is placed such that the user is sitting on it. As in the previous case it can have different configurations, the simplest of which is that which allows fulfilling its purpose, that is, allowing to house means for guiding the lap belt (2.1).

The upper part (1) can in turn comprise means for guiding the shoulder strap (1.1).

This is, the positioner is a vest-like accessory that is worn as such, with the corresponding comfort, as it simply requires inserting the arms through the sleeve openings and fastening it, when necessary, in the front.

To place it in working mode it is only necessary, when sitting in the car seat, to insert the lap-belt guiding means (2.1) and pass the seatbelt (5) through the corresponding guiding means.

As regards the guiding means (1.1, 2.1), several embodiments are proposed below that can be combined with each other in different ways, the most advantageous of which are shown below.

One way of executing the guiding means for the shoulder strap (1.1) consists in a guide disposed vertically (1.1.1) in the mid area of the user's sternum. This type of guide has the advantage that it occupies very little space and that placing the seatbelt in it is simple. In addition, this guide can be used for the two possible orientations of the seatbelt and driving positions, on the left and right sides.

Another embodiment of the guiding means for the shoulder strap (1.1) consists in a guide disposed at an inclined angle (1.1.2) on one side of the neckline of the upper part (1). Unlike the previous one, two guides (1.1.2) are needed, one on each side of the neckline, to allow guiding the seatbelt in its two possible orientations and driving sides, using only one of them in each case.

In general, the purpose of the shoulder-strap guiding means (1.1) is to hold the strap, guiding it so that it passes between the breasts, and orienting the upper part so that it passes over the centre of the collarbone, separating it from the neck and directing the lower part towards the upper part of the abdomen. Although the seatbelt remains attached, it can slide freely to allow it to slide in case the pre-tensioner and/or load limiter act, and to allow the user to move freely.

It has been verified that the most advantageous configuration of both guides (1.1.1, 1.1.2) is that having a C-shaped cross-section with respect to the longitudinal axis of the seatbelt (5.1), with the open side facing outward, making it very easy to introduce the seatbelt and providing a correct guidance.

Occasionally, one of the aforementioned guides (1.1.1, 1.1.2) on its own is not enough to ensure the correct position of the seatbelt, so that it is necessary to complement it with other guides such as a shoulder guide (1.1.3), which stops the shoulder strap (5.1) from moving towards the neck, or a waist guide (1.1.4), which stops the belt from sliding down and crossing the abdomen.

The shoulder guides (1.1.3) or waist guides (1.1.4) are generally placed on either side of the positioner, so that they can be used in any seat of the vehicle.

It has also been verified that the most advantageous configuration of these guides is with a hook profile, that is, a J-shaped cross section with respect to the longitudinal axis of the belt (5.1), enough to retain the belt, as it is guided in the vertical guide (1.1.1) at the mid-zone of the sternum, or the inclined guide (1.1.2) on one side of the neckline.

With respect to the lower part (2) of the positioner, the lap-belt guiding means (2.1) are placed between the user's thighs, or on both outer sides of the user's thighs.

Although these two embodiments are described as alternatives, it is also possible for a positioner to include all the lap-belt guiding means (2.1). The aim is to allow users to chose the most convenient positioning option of the lap belt (5.2) according to their situation and clothing.

The preferred configuration for these lap-belt guiding means (2.1) consists in a Y-shaped strap (2.1.1), the two-armed end of which is connected to the lower part (2) and the one-armed end of which is attached to a body (2.1.2) that embraces the seatbelt.

The body (2.1.2) that embraces the seatbelt does so by folding along two folding lines, when it is of the envelope type, and is also slightly curved in a longitudinal sense to adapt to the abdomen, thereby being more ergonomic. The body can have a fast closing means.

Another embodiment of the body (2.1.2) of the lap-belt guiding means (2.1) consists in a guide with a hook-shaped profile, a J-shaped cross section with respect to the longitudinal axis of the belt (5.2), which retains the lap belt (5.2) under the abdomen and prevents it from moving up.

As regards the middle part (3), it can cover only part of the surface of the back or extend over the entire back, as mentioned before.

The positioner is made of materials that can be woven, including both natural and artificial fibres. The guide elements are preferably made with plastic materials.

In this way, a preferred embodiment is that in which the upper part (1), the lower part (2) and the middle part (3) form a single piece, so that the positioner resembles a clothing item that is worn similarly to a vest or jacket, having approximately the same weight and therefore being comfortable for the user.

In order to make the positioner valid for different user sizes, even in the different stages of pregnancy, it comprises means for adjusting the size (4) in the areas of the shoulders, back and/or torso above the abdomen and in the back, normally elastic straps that automatically adjust to the different sizes.

In addition, the upper part (1) can include a mesh (6) joined at its top to the anterior lower edge (1.3) and running over the user's abdomen so that it covers it. This allows increasing comfort for the user by providing a soft support for the abdominal area.

The invention claimed is:

1. A vehicle seat belt positioner, wearable by a user, and for interacting with a seat belt having a shoulder strap and a lap belt, the vehicle seat belt positioner comprising:
   two lateral sides and an anterior portion;
   a vest adapted to guide the shoulder strap diagonally, from one lateral side of the vehicle seat belt positioner to the other, over the anterior portion of the vehicle seat belt positioner and over a user's torso such that the shoulder strap is positioned above a user's abdomen;
   a lower part, upon which the user sits, such that the lower part comprises a lap belt guide,
   wherein the lap belt guide includes two pieces, each on opposite lateral sides of the vehicle seat belt positioner, such that when the two pieces come together, the lap belt guide positions the lap belt tensionably underneath the user's abdomen; and
   a middle part that connects the vest and the lower part.

2. The vehicle seat belt positioner of claim 1, wherein the vest comprises a shoulder strap guide.

3. The vehicle seat belt positioner of claim 2, wherein the shoulder-strap guide comprises a vertically-disposed guide adapted to be positioned over a mid-area of a user's sternum.

4. The vehicle seat belt positioner of claim 3, wherein the vertically-disposed guide has a C-shaped cross section with the open side facing outward.

5. The vehicle seat belt positioner of claim 3, wherein the shoulder-strap guide comprises a shoulder guide.

6. The vehicle seat belt positioner of claim 3, wherein the shoulder-strap guide comprises a lap guide.

7. The vehicle seat belt positioner of claim 2, wherein the shoulder-strap guide comprises a guide disposed at an angle on one side of a neckline of the vest.

8. The vehicle seat belt positioner of claim 7, wherein the shoulder strap guide comprises a shoulder guide.

9. The vehicle seat belt positioner of claim 7, wherein the shoulder strap guide comprises a lap guide.

10. The vehicle seat belt positioner of claim 1, wherein the anterior portion comprises a fastener.

11. The vehicle seat belt positioner of claim 1, wherein a lap-belt guide is adapted to be disposed between a user's thighs.

12. The vehicle seat belt positioner of claim 11, wherein the lap-belt guide comprises a Y-shaped strap, the two-armed end of which is connected to the lower part and the one-armed end of which is attached to a body that embraces the seat belt.

13. The vehicle seat belt positioner of claim 12, wherein the body that embraces the seat belt is of an envelope type.

14. The vehicle seat belt positioner of claim 12, wherein the body that embraces the seatbelt has a J-shaped cross section.

15. The vehicle seat belt positioner of claim 1, wherein a lap-belt guide is adapted to be disposed on the outside of both of the user's thighs.

16. The vehicle seat belt positioner of claim 15, wherein the lap belt guide comprises a Y-shaped strap, the two-armed end of which is connected to the lower part and the one-armed end of which is attached to a body that embraces the seat belt.

17. The vehicle seat belt positioner of claim 1, wherein the vest, the lower part and the middle part form a single piece.

18. The vehicle seat belt positioner of claim 1, wherein the seat belt positioner comprises an adjuster that adjusts the size of the vest in the areas of a user's shoulders, a user's back, and around the torso above the user's abdomen.

19. The vehicle seat belt positioner of claim 1, wherein the vest comprises a mesh adapted to be positioned over the user's abdomen such that the mesh covers the user's abdomen and joins, at the mesh's top, an anterior lower edge of the vest.

* * * * *